(12) United States Patent
Yates, Sr.

(10) Patent No.: US 6,394,713 B1
(45) Date of Patent: May 28, 2002

(54) DRILL GUIDE APPARATUS

(76) Inventor: Phillip E. Yates, Sr., 7660 Darci Ridge Ct., Kissimmee, FL (US) 34747

( * ) Notice: Subject to any disclaimer, the term of this patent is extended or adjusted under 35 U.S.C. 154(b) by 0 days.

(21) Appl. No.: 09/797,619

(22) Filed: Mar. 5, 2001

(51) Int. Cl.[7] .............................................. B23B 49/02
(52) U.S. Cl. ................................ 408/115 R; 408/72 R
(58) Field of Search ........................... 408/72 R, 72 B, 408/115 R, 115 B

(56) References Cited

U.S. PATENT DOCUMENTS

| | | |
|---|---|---|
| 706,392 A | 8/1902 | Corliss |
| 2,166,692 A * | 7/1939 | Ray ..................... 408/115 R |
| 2,341,107 A * | 2/1944 | MacDonald ............ 408/115 R |
| 2,497,733 A * | 2/1950 | Kebour .................. 408/115 R |
| 3,788,759 A * | 1/1974 | Grunert ................. 408/115 R |
| 4,445,264 A * | 5/1984 | Banerian ................ 408/115 B |
| D295,016 S | 4/1988 | Forrester |
| 4,752,162 A | 6/1988 | Groh |
| 4,873,769 A * | 10/1989 | Casanave .................. 408/72 R |
| 5,312,409 A | 5/1994 | McLaughlin et al. |
| 5,409,329 A | 4/1995 | Juang |
| 5,743,916 A | 4/1998 | Greenberg et al. |

FOREIGN PATENT DOCUMENTS

GB  1314809 A * 4/1973 ............. 408/115 R

* cited by examiner

Primary Examiner—Steven C. Bishop

(57) ABSTRACT

A drill guide apparatus for guiding a drill bit along a path that is axially aligned with an edge of a piece of material being drilled. The drill guide apparatus includes a guide block and a base block for guiding the drill bit along the path. The guide block includes a guide bore extending through an upper and lower surface of the guide block. The base block is provided for moving along an edge of the work piece. The base block is mounted on the guide block to set a distance between said guide bore and said base block for establishing a separation between said path and the edge of the work piece.

10 Claims, 5 Drawing Sheets

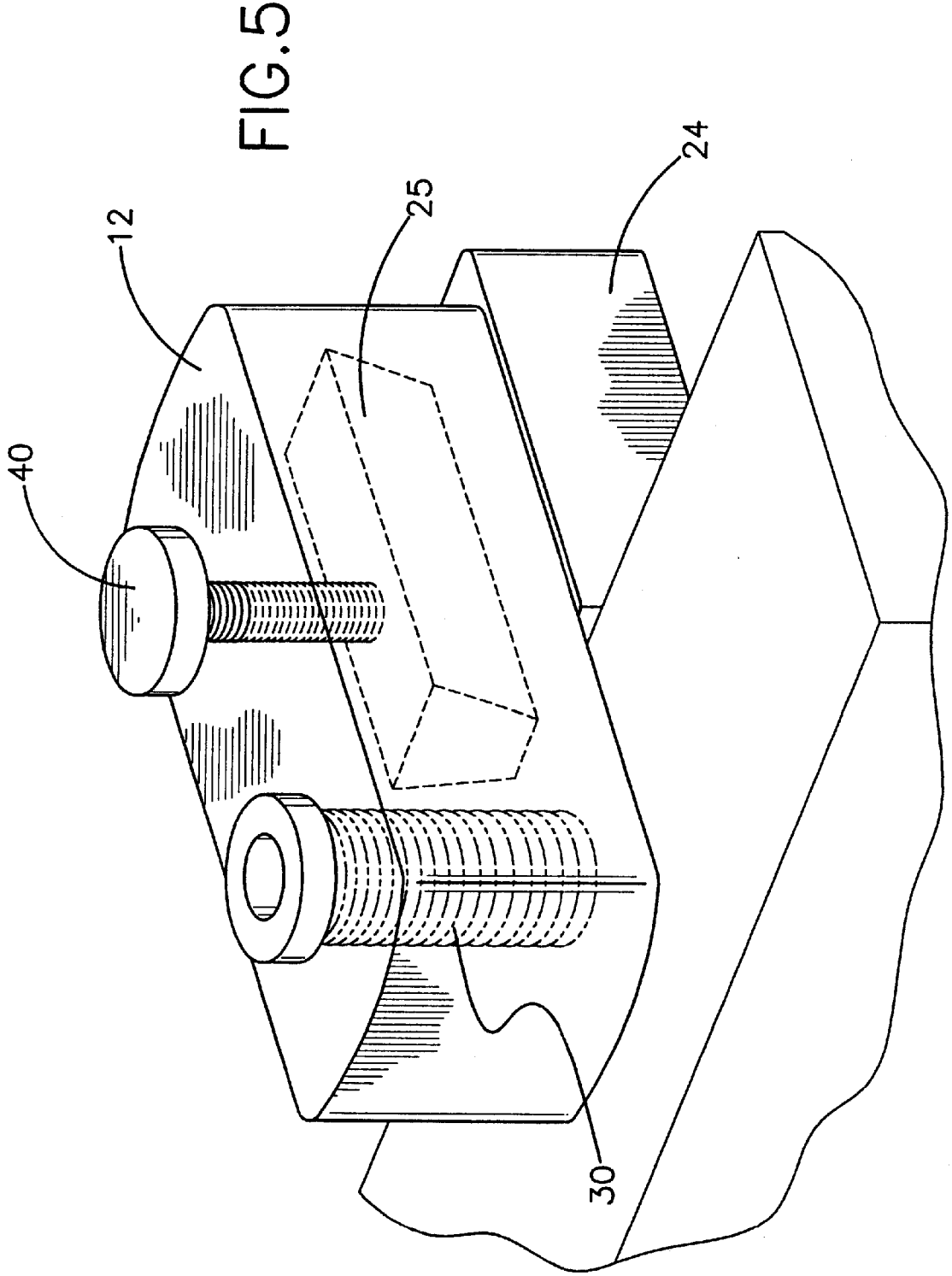

DRILL GUIDE APPARATUS

BACKGROUND OF THE INVENTION

1. Field of the Invention

The present invention relates to guiding devices and more particularly pertains to a new drill guide apparatus for guiding a drill bit along a path that is aligned with an edge of a piece of material being drilled.

2. Description of the Prior Art

The use of guiding devices is known in the prior art. More specifically, guiding devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,743,916; U.S. Pat. No. 5,409,329; U.S. Pat. No. 4,752,162; U.S. Pat. No. 706,392; U.S. Pat. No. 5,312,409; and U.S. Pat. No. Des. 295,016.

While these devices fulfill their respective, particular objectives and requirements, the aforementioned patents do not disclose a new drill guide apparatus. The inventive device includes a guide block and a base block for guiding the drill bit along the path. The guide block includes a guide bore extending through an upper and lower surface of the guide block. The base block is provided for moving along an edge of the work piece. The base block is mounted on the guide block to set a distance between said guide bore and said base block for establishing a separation between said path and the edge of the work piece.

In these respects, the drill guide apparatus according to the present invention substantially departs from the conventional concepts and designs of the prior art, and in so doing provides an apparatus primarily developed for the purpose of guiding a drill bit along a path that is axially aligned with an edge of a piece of material being drilled.

SUMMARY OF THE INVENTION

In view of the foregoing disadvantages inherent in the known types of guiding devices now present in the prior art, the present invention provides a new drill guide apparatus construction wherein the same can be utilized for guiding a drill bit along a path that is axially aligned with an edge of a piece of material being drilled.

The general purpose of the present invention, which will be described subsequently in greater detail, is to provide a new drill guide apparatus and method which has many of the advantages of the guiding devices mentioned heretofore and many novel features that result in a new drill guide apparatus which is not anticipated, rendered obvious, suggested, or even implied by any of the prior art guiding devices, either alone or in any combination thereof.

To attain this, the present invention generally comprises a guide block and a base block for guiding the drill bit along the path. The guide block includes a guide bore extending through an upper and lower surface of the guide block. The base block is provided for moving along an edge of the work piece. The base block is mounted on the guide block to set a distance between said guide bore and said base block for establishing a separation between said path and the edge of the work piece.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new drill guide apparatus and method which has many of the advantages of the guiding devices mentioned heretofore and many novel features that result in a new drill guide apparatus which is not anticipated, rendered obvious, suggested, or even implied by any of the prior art guiding devices, either alone or in any combination thereof.

It is another object of the present invention to provide a new drill guide apparatus which may be easily and efficiently manufactured and marketed.

It is a further object of the present invention to provide a new drill guide apparatus which is of a durable and reliable construction.

An even further object of the present invention is to provide a new drill guide apparatus which is susceptible of a low cost of manufacture with regard to both materials and labor, and which accordingly is then susceptible of low prices of sale to the consuming public, thereby making such drill guide apparatus economically available to the buying public.

Still yet another object of the present invention is to provide a new drill guide apparatus which provides in the apparatuses and methods of the prior art some of the advantages thereof, while simultaneously overcoming some of the disadvantages normally associated therewith.

Still another object of the present invention is to provide a new drill guide apparatus for guiding a drill bit along a path that is axially aligned with an edge of a piece of material being drilled.

Yet another object of the present invention is to provide a new drill guide apparatus which includes a guide block and a base block for guiding the drill bit along the path. The guide block includes a guide bore extending through an upper and lower surface of the guide block. The base block is provided for moving along an edge of the work piece. The base block is mounted on the guide block to set a distance between said guide bore and said base block for establishing a separation between said path and the edge of the work piece.

Still yet another object of the present invention is to provide a new drill guide apparatus that provides a way for construction workers and hobbyists to drill straight holes in a piece of material. Additionally, the present invention reduces the likelihood of damage to material being drilled, due to angled drilling, by defining a perpendicular drill orientation.

Even still another object of the present invention is to provide a new drill guide apparatus that reduces the likelihood of injury to an individual drilling a piece of material or two pieces of material together. The present invention helps define a straight drilling path into the material being drilled thereby reducing the likelihood that users will drill at an angle through the material and injure themselves.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a schematic perspective view of the present invention showing the positioning of the guide sleeve and the fastening member mounted in the guide block.

DESCRIPTION OF THE PREFERRED EMBODIMENT

Figure 1:
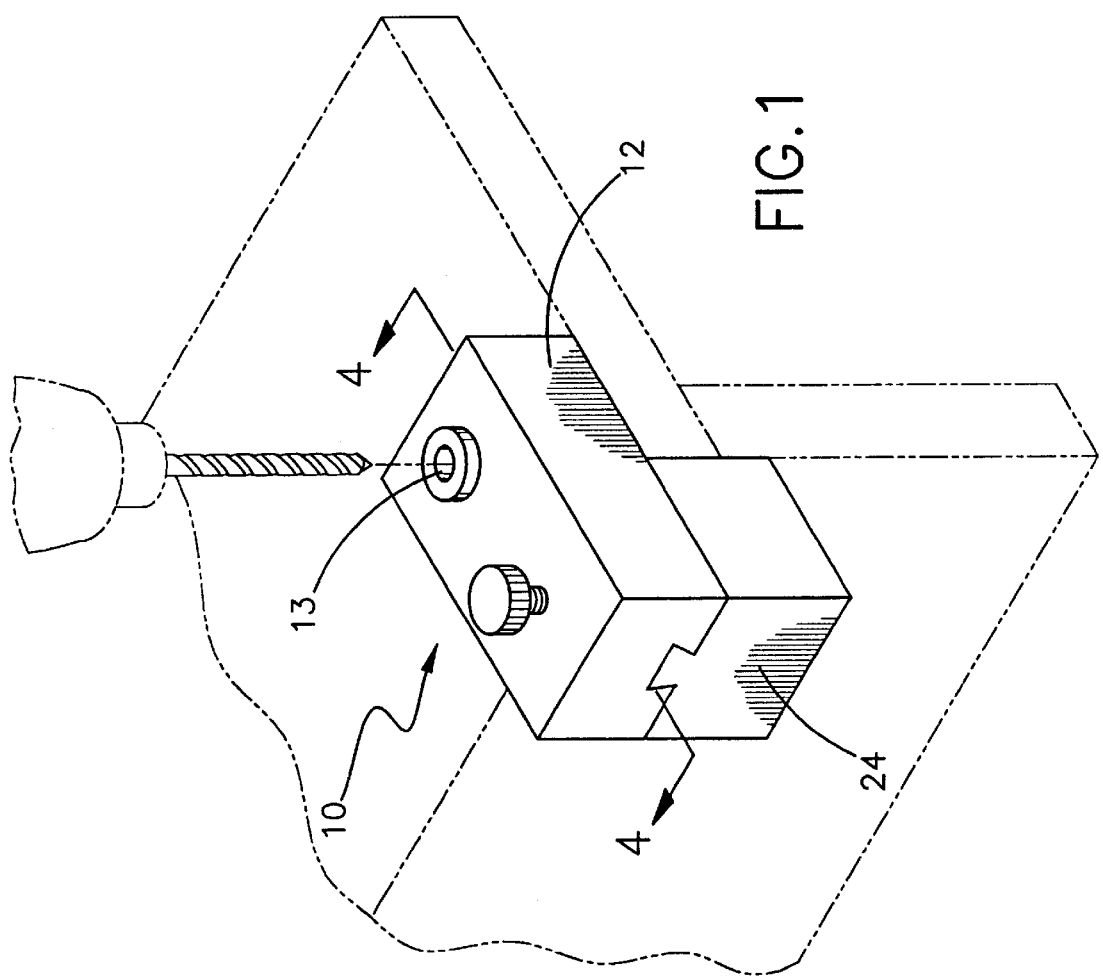
FIG. 1 is a schematic perspective view of a new drill guide apparatus according to the present invention showing a guide block and a base block abutted against a piece of material to be drilled.
Figure 2:
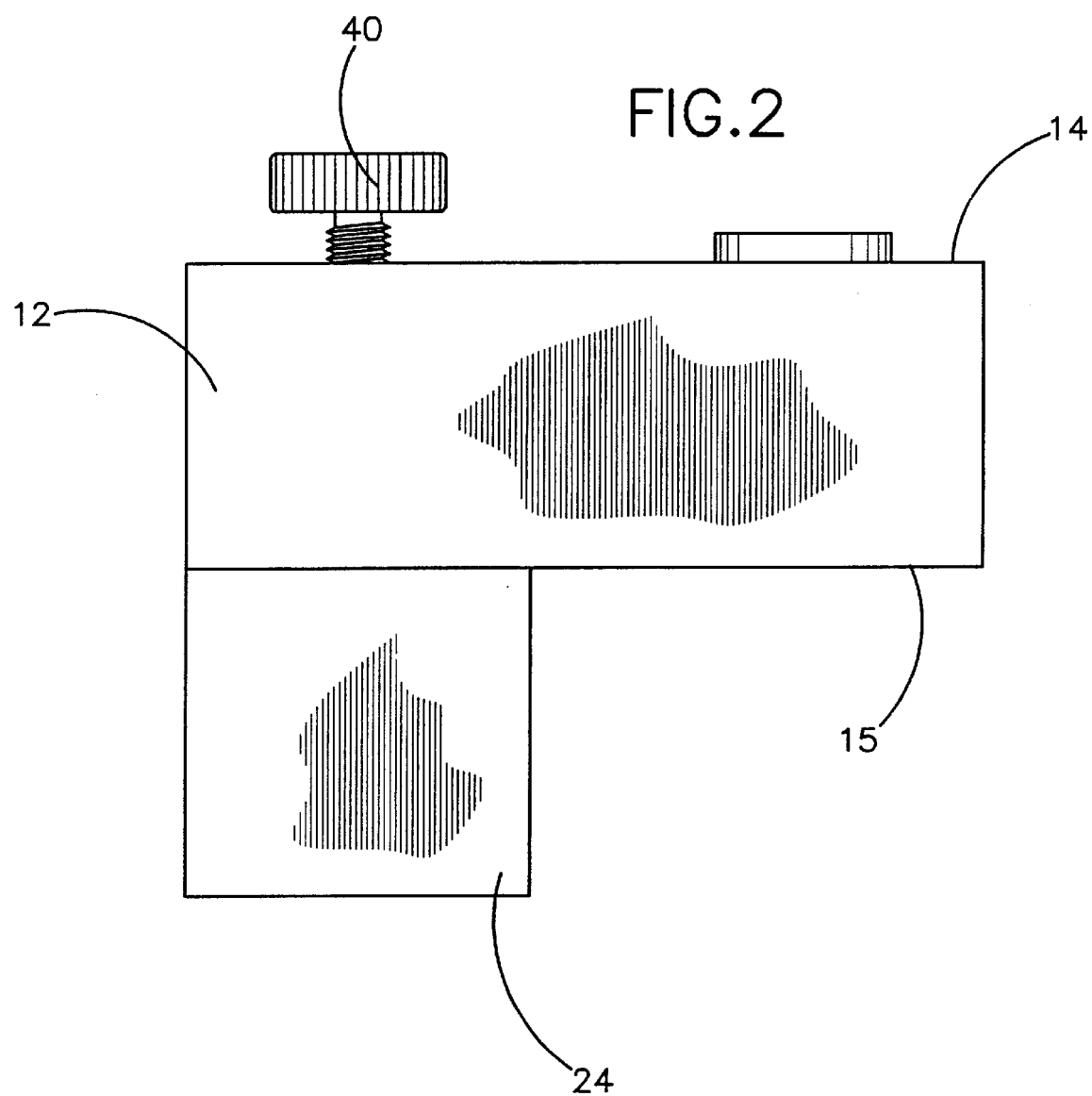
FIG. 2 is a schematic side view of the present invention showing the guide block and the base block.

With reference now to the drawings, and in particular to FIGS. 1 through 5 thereof, a new drill guide apparatus embodying the principles and concepts of the present invention and generally designated by the reference numeral 10 will be described.

As best illustrated in FIGS. 1 through 5, the drill guide apparatus 10 generally comprises a guide block 12 for guiding the drill bit along the path. The guide block 12 includes a guide bore 13 that extends through an upper 14 and lower surface 15 of the guide block 12. As particularly illustrated in FIG. 3, the lower surface 15 of the guide block 12 includes a channel 16 extending therein. The channel 16 extends generally between a first end surface 17 of the guide block 12 and a location positioned generally adjacent to the guide bore 13. The channel 16 preferably comprises a dove tail channel. A pair of inner side walls 19 of the dovetail channel define a width therebetween, wherein the width generally tapers from a base wall 20 of the dovetail channel toward an edge 21 of each of the inner side walls 19. The guide block 12 may comprise a substantially rigid material such as, for example, a wood, a plastic or a metal material. The base block 12 may measure approximately one inch in height and two inches in width and length.

A base block 24 is provided for moving along an edge of the work piece. The base block 24 is mounted on the guide block 12 and maybe manufactured so that it is movably positionable with respect to said guide block 12. The base block 24 would be movable to set a distance between said guide bore 13 and said base block 24 for establishing a separation between said path and the edge of the work piece. The base block 24 includes a protruding member 25 extending from an upper side 26 of the base block 24. The protruding member 25 preferably extends generally between a pair of ends 27 of the base block 24. The protruding member 25 is removably slidable in the dovetail channel of the guide block 12. The protruding member 25 preferably comprises a dovetail protrusion. The base block 24 may measure approximately one inch in width and height and two inches in length.

Figure 3:
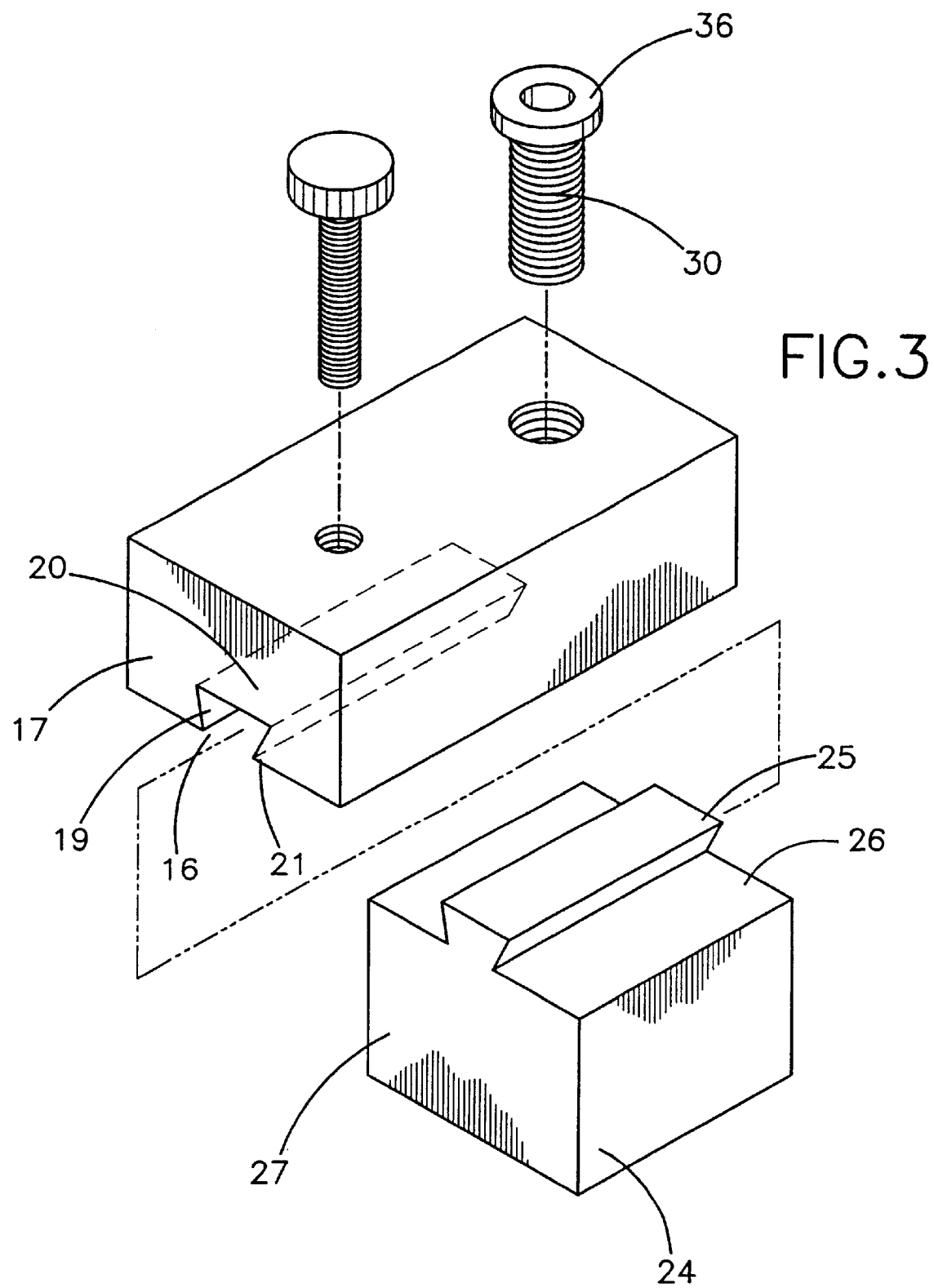
FIG. 3 is a schematic exploded view of the present invention.
Figure 4:
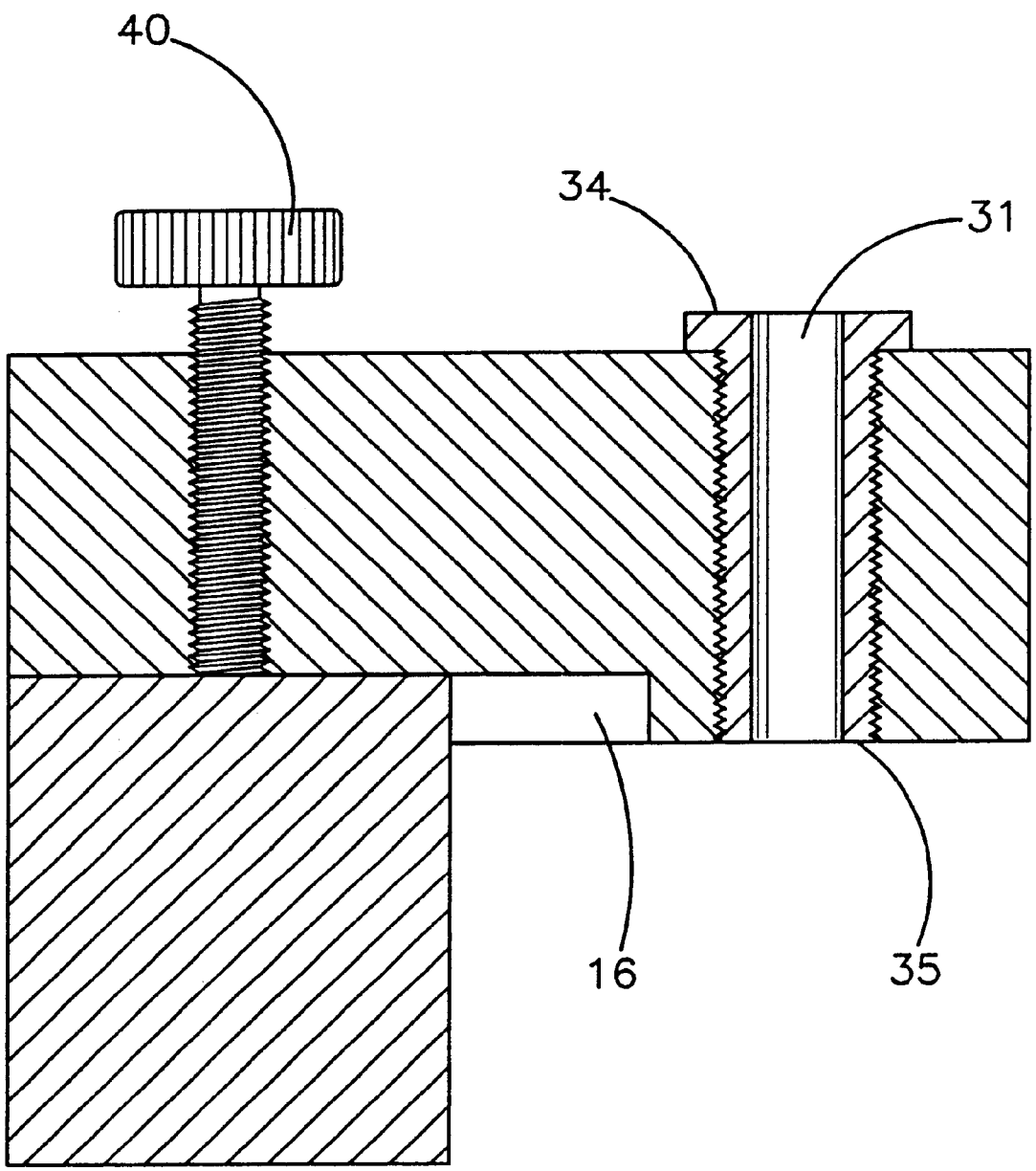
FIG. 4 is a schematic cross-sectional view of the present invention taken along line 4—4 of FIG. 1 showing a fastening member and a guide sleeve threadedly mounted in the guide block.

As illustrated in FIGS. 3, 4 and 5, a guide sleeve 30 maybe provided for guiding the drill bit through the guide bore 13. The guide sleeve 30 is preferably threadedly mountable in the guide bore 13. The guide sleeve 30 includes a hole 31 extending through a first end 34 and a second end 35 of the guide sleeve 30. A collar 36 is preferably mounted on a portion of the guide sleeve 30. The collar 36 is positioned generally adjacent to the first end 34 of the guide sleeve 30. In one embodiment of the present invention, a surface of the collar 36 selectively abuts the upper surface 14 of the guide block 12 when the guide sleeve 30 is positioned in the guide bore 13.

As illustrated in FIGS. 3, 4 and 5, a fastening member 40 maybe provided for fixedly positioning the base block 24 with respect to the guide block 12. The fastening member 40 is preferably threadedly mounted in a hole 41 extending through the upper 14 and lower 15 surfaces of the guide block 12. In one embodiment of the present invention, the fastening member 40 extends through the guide block 12 and selectively abuts a portion of the protruding member 25. The fastening member 40 may comprise a fastener such as a thumbscrew.

In use, the base block 24 is positioned in relation to the guide block 12 such that a distance between the base block 24 and the guide block 12 is adjusted for setting a distance between the path 13 and the edge of the material being drilled. A drill is then insertable in the guide bore 13. Depending upon the size of hole needed to be drilled various sized guide sleeves 30 may be used.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A drill guide apparatus for guiding a drill bit along a path that is axially aligned with an edge of a piece of material, said apparatus comprising:

a guide block for guiding the drill bit along the path, said guide block having a guide bore extending through an upper and lower surface of said guide block, said guide block having a first end and a second end; and a base block for moving along an edge of the work piece, said base block being mounted on said guide block to set a distance between said guide bore and said base block for establishing a separation between said path and the edge of the work piece, wherein said base block is movably positionable on said guide block such that said distance between said guide bore and said base block is adjustable for establishing a separation between said path and the edge of the work piece, said base block having a protruding member and said guide block having a channel extending in said lower surface of said guide block, said protruding member being removably slidably mounted in said channel;

wherein said channel extends from the first end of said guide block toward the second end of said guide block, said channel terminating in a blind end short of said second end such that said channel does not communicate with said second end, said guide bore being located between said blind end of said channel and the second end of said guide block for preventing said protruding member and said base block from passing through a longitudinal axis of said guide bore.

2. The drill guide apparatus of claim 1, wherein said channel comprises a dove tail channel and said protruding member comprises a dovetail protrusion.

3. The drill guide apparatus of claim 2, wherein a pair of inner side walls of said dovetail channel define a width therebetween, wherein said width generally tapers from a base wall of said dovetail channel toward an edge of each of said inner side walls.

4. The drill guide apparatus of claim 1, wherein said protruding member protrudes from an upper side of said base block and extends generally between a pair of ends of said base block.

5. The drill guide apparatus of claim 1, additionally including:

a guide sleeve for guiding the drill bit through said guide bore, said guide sleeve having a hole extending through a first end and a second end of said guide sleeve.

6. The drill guide apparatus of claim 5, wherein said guide sleeve is threadedly mountable in said guide bore.

7. The drill guide apparatus of claim 5, additionally including:

a collar being mounted on a portion of said guide sleeve, said collar being positioned generally adjacent to said first end of said guide sleeve.

8. The drill guide apparatus of claim 1, additionally including:

a fastening member for selectively fixing the position of said base block with respect to said guide block, said fastening member being threadedly mounted in a hole extending through an upper and lower surface of said guide block, wherein said fastening member extends through said guide block and selectively abuts a portion of said protruding member.

9. The drill guide apparatus of claim 8, wherein said fastening member comprises a screw.

10. A drill guide apparatus for guiding a drill bit along a path that is axially aligned with an edge of a piece of material, said apparatus comprising:

a guide block for guiding the drill bit along the predetermined path, said guide block having a guide bore extending through an upper and lower surface of said guide block, said guide block having a first end and a second end, said channel comprising a dove tail channel, a pair of inner side walls of said dovetail channel define a width therebetween, wherein said width generally tapers from a base wall of said dovetail channel toward an edge of each of said inner side walls;

a base block for moving along an edge of the work piece, said base block being mounted on said guide block, said base block being movably positionable on said guide block to set a distance between said guide bore and said base block for establishing a separation between said path and the edge of the work piece, said base block having a protruding member extending from an upper side of said base block, said protruding member extending generally between a pair of ends of said base block, said protruding member being removably slidable in said dovetail channel of said guide block, said protruding member comprising a dovetail protrusion;

wherein said channel extends from the first end of said guide block toward the second end of said guide block, said channel terminating in a blind end short of said second end such that said channel does not communicate with said second end, said guide bore being located between said blind end of said channel and the second end of said guide block for preventing said protruding member and said base block from passing through a longitudinal axis of said guide bore;

a guide sleeve for guiding the drill bit through said guide bore, said guide sleeve being threadedly mountable in said guide bore, said guide sleeve having a hole extending through a first end and a second end of said guide sleeve, a collar being mounted on a portion of said guide sleeve, said collar being positioned generally adjacent to said first end of said guide sleeve, wherein a surface of said collar selectively abuts said upper surface of said guide block when said guide sleeve is positioned in said guide bore; and a fastening member for selectively fixing the position of said base block with respect to said guide block, said fastening member being threadedly mounted in a hole extending through said upper and lower surfaces of said guide block, wherein said fastening member extends through said guide block and selectively abuts a portion of said protruding member, said fastening member comprising a screw.

* * * * *